United States Patent [19]

Shetty et al.

[11] Patent Number: 5,837,359

[45] Date of Patent: Nov. 17, 1998

[54] SATIN AND TINTED SATIN IRIDESCENT FILMS

[75] Inventors: Ramakrishna S. Shetty, Pelham; Scott A. Cooper, Yorktown Heights, both of N.Y.

[73] Assignee: The Mearl Corporation, Ossining, N.Y.

[21] Appl. No.: 657,189

[22] Filed: Jun. 3, 1996

[51] Int. Cl.$^6$ .............................. B32B 7/02; B32B 27/08; B32B 27/30; B32B 27/36

[52] U.S. Cl. .......................... 428/213; 428/206; 428/212; 428/324; 428/480; 428/483; 428/520; 428/522; 359/577; 359/580; 359/586; 359/587

[58] Field of Search ...................... 428/323, 324, 428/402, 403, 480, 483, 522, 500, 910, 15, 206, 212; 106/400, 415, 417; 359/577, 580, 586, 587

[56] References Cited

U.S. PATENT DOCUMENTS

| | | | |
|---|---|---|---|
| 3,759,647 | 9/1973 | Schrenk et al. | 425/131 |
| 3,801,429 | 4/1974 | Schrenk et al. | 161/181 |
| 4,310,584 | 1/1982 | Cooper et al. | 428/212 |
| 4,598,015 | 7/1986 | Panush | 428/324 |
| 4,797,308 | 1/1989 | Mattin | 428/15 |
| 5,089,318 | 2/1992 | Shetty et al. | 428/212 |
| 5,122,905 | 6/1992 | Wheatley et al. | 359/586 |
| 5,451,449 | 9/1995 | Shetty et al. | 428/195 |

FOREIGN PATENT DOCUMENTS

| | | |
|---|---|---|
| 514223 | 11/1982 | European Pat. Off. . |
| 298603 | 11/1989 | European Pat. Off. . |
| 404463 | 12/1990 | European Pat. Off. . |
| 426636 | 5/1991 | European Pat. Off. . |
| 2-064166 | 3/1990 | Japan . |
| 2-239935 | 9/1990 | Japan . |
| 7-258489 | 10/1995 | Japan . |

*Primary Examiner*—Vivian Chen
*Attorney, Agent, or Firm*—Ostrolenk, Faber, Gerb & Soffen, LLP

[57] ABSTRACT

This invention provides a thermoplastic multilayer resinous film in which two or more resinous materials form a plurality of very thin layers of substantially uniform thickness, the layers being substantially parallel, the contiguous adjacent layers being of different transparent thermoplastic resinous materials differing in refractive index, each of the outermost skin layers being at least 5% of the total thickness of the film and the multilayer film containing a sufficient quantity of a pearlescent pigment in at least one of the interior layers to render it non-glossy.

13 Claims, No Drawings

SATIN AND TINTED SATIN IRIDESCENT FILMS

BACKGROUND OF THE INVENTION

Multilayer plastic films, which contain alternating layers of two polymers of different refractive indexes, are iridescent when the individual layers are of suitable thicknesses. Such films are described in U.S. Pat. No. Re 31,780 to Cooper, Shetty and Pinsky, and U.S. Pat. No. 5,089,318 and U.S. Pat. No. 5,451,449, both to Shetty and Cooper which are hereby incorporated by reference, and other patents. Iridescent color is produced by the phenomenon of light interference. The pair of alternating polymer layers constitute the optical core. Usually, the outermost layers or skin layers are thicker than the layers in the optical core. This thicker skin may consist of one of the components in the optical core or may be a different polymer which is utilized to impart desired physical, mechanical or other properties to the film.

Most of the iridescent films are clear and glossy with haze levels in the 1 to 5% range. There have been various requests in the past for a subdued or non-glossy iridescent film. Various methods of producing a non-glossy film have been tried, but in the past, these have had their drawbacks. Some of the methods tried were:

1. An additive in the skin material which would disrupt the surface of the film and scatter light resulting in a hazy film. The drawback here was that when the film was laminated, the roughness in the surface that was laminated was filled with the adhesive and the haze was reduced by half. The additive had to have particle sizes equal to or less than the skin layer (less than or equal to 1 or 2 microns). Trying to increase the amount of additives resulted in problems in trying to draw down the molten web.

2. Adding a pigment like $TiO_2$ gave the desired haze levels, but added a lot of whiteness to the film and did not provide the desired look.

3. Blending two polymers with different refractive indexes gave the desired haze levels. The two polymers, generally, had to be from different polymer families due to the requirement that the refractive indexes had to be different. This resulted in blending and processing problems and resulted in a deterioration of the properties of the film.

In the past, it had been attempted to incorporate pearlescent pigments into the skins, but because of the relatively large particle sizes, sufficient pigment could not be gotten into the film to achieve the desired effect without running into film casting problems.

SUMMARY OF THE INVENTION

With the introduction of the finer particle sizes of pearlescent pigments, it has now been found that sufficient pearlescent pigments can be added to achieve haze levels from 10% to 80% and possibly more. The pearlescent pigments offer a soft, satiny, pearly look to the base iridescent colors which is very pleasing to the eye, without substantially changing the properties of the base film.

More specifically, this invention provides a thermoplastic resinous multilayer laminate film of a plurality of very thin layers of substantially uniform thickness, the layers being generally parallel the contiguous adjacent layers being of different transparent thermoplastic resinous materials, each of the outermost skin layers being at least 5% of the total thickness of the film and the multilayer film containing a sufficient quantity of a pearlescent pigment to render it non-glossy.

The multilayer laminate film preferably has at least 10 of the very thin layers, more preferably at least 35 and most preferably at least 70.

Adjacent layers of the laminate film preferably differ in refractive index by at least about 0.03 and more preferably by at least about 0.06.

The preferred transparent thermoplastic resinous materials of the laminate film are polyethylene terephthalate (PET), polymethyl methacrylate (PMMA), polybutylene terephthalate (PBT) and glycol modified polyethylene terephthalate (PETG).

The pearlescent pigment can be incorporated into either at least one of the outermost (skin) layers or at least one interior layer of the film.

In one embodiment of this invention, a sufficient quantity of a transparent, preferably stable dye is dissolved in at least one of the layers to enhance or modify the apparent color of at least one of the reflection and transmission colors of the film. The dye may be present in each of the different thermoplastic resinous materials or in less than all of them.

The fine particle pearlescent pigments can be readily incorporated into many of the resins used to manufacture iridescent films, and therefore laminate film formulations of these resins in the satin look can conveniently be produced.

DETAILED DESCRIPTION OF THE INVENTION

The pearlescent pigments used herein consist of mica platelets coated with an oxide, usually titanium dioxide and/or iron oxide. The pigments are transparent and reflect light because of their smooth surface and high index of refraction. Since coatings of controlled thickness may also produce color by optical interference, certain pearlescent pigments impart color as well as luster. The pearlescent pigments have the following properties:

1. The pearlescent pigments are transparent or translucent to allow the light to pass through to the optical core of the multilayer films and to allow the iridescent colors to pass through the pigments and be visible, resulting in a iridescent film.

2. The pearlescent pigments scatter sufficient light from the edges to result in a non-glossy, satiny film with high haze levels. The light is scattered by the pearlescent pigments within the film and is not a surface phenomenon. Hence, the haze level and the satin effect is not reduced if the film is laminated, coated, etc.

3. The pearlescent pigment particles should be small enough (2–15 microns) so that there can be a sufficient amount of pigments added to the polymers to achieve the desired haze levels (10 to 80%) and not encounter problems in maintaining a web during the film making process.

Magnapearl 3100® (titanium dioxide coated mica) and Micromica Red® (titanium dioxide coated mica with a red interference color) are the two preferred pearlescent pigments used to manufacture the satin and tinted satin iridescent films of this invention. Both have all the above characteristics and the particle size range of these two pigments are in the 2 to 15 micron range.

The following examples are illustrative:

Example 1

Polyethylene terephthalate (PET) thermoplastic polyester was fed to the feedblock from one extruder and polymethyl methacrylate (PMMA) from a second extruder to form a 115 layer optical core, and a second skin layer (about 20% of the total thickness) of glycol modified polyethylene terephthalate (PETG) was added to each surface by means of a third extruder to form a 0.73 mil (18.5 micron) thick iridescent film. The film was brightly iridescent and was prevailing red and green when seen by reflection at perpendicular incidence, and blue and pink when seen by transmission at perpendicular incidence. The film had a bright, glossy surface and had a haze level of approximately 3%.

The foregoing procedure was repeated except that a white pearlescent pigment was incorporated into the second skin layer of glycol modified polyethylene terephthalate at a concentration level of 5%. The pearlescent pigment had a particle size range of 2 to 15 microns and was a titanium dioxide coated mica. The resulting film had the same reflection and transmission colors as the above sample but had a non-glossy, satiny surface and had a haze level of approximately 36%.

Example 2

A multilayer structure with the same polymers in the optical core as in Example 1 was prepared except that the optical core had 229 layers and the two outer skin layers added by means of a third extruder were polyethylene terephthalate which had a white pearlescent pigment incorporated into it at a concentration level of 5%. The pearlescent pigment was a titanium dioxide coated mica with a particle size range of 2 to 15 microns. The resulting film was 1.30 mils (33 microns) in thickness and had more intense iridescent colors than the film in Example 1 because of the increased number of layers in the optical core. The addition of the pearlescent pigment resulted in a film which had a non-glossy, satiny surface and had a haze level of approximately 43%.

Examples 3 to 7 are presented below in tabular form.

| Example | Total No. of Layers | High Index Polymer | Low Index Polymer | Skin Layer(s) Polymer | Haze Level % |
|---|---|---|---|---|---|
| 3 | 117 | PET | PMMA | PETG with 3.5% White Pearlescent Pigment | 26 |
| 4 | 117 | PBT | PMMA | PBT with 6.25% White Pearlescent Pigment | 47 |
| 5 | 117 | PBT | PMMA | PBT with 12.5% White Pearlescent Pigment | 77 |
| 6 | 117 | PETG | PMMA | PMMA with 5% White Pearlescent Pigment | 52 |
| 7 | 117 | PET | PMMA | PETG with 5% Pearlescent Pigment having red interference colors | 15 |

Example 8

Example 7 was repeated where the thicknesses of the PETG outer skin layers were doubled, resulting in a film with a haze level of 31%.

Example 9

Example 1 was repeated with a red pyridone dye incorporated into the lower index polymer PMMA at a concentration of 0.07%. This resulted in a film similar to the colored iridescent film with a red dye, but with a non-glossy, satiny surface and a haze level of approximately 36%.

Example 10

Example 1 was repeated with a blue anthraquinone dye incorporated into the lower index polymer PMMA at a concentration of 0.4%. This resulted in a film similar to the colored iridescent film with a blue dye, but with a non-glossy, satiny surface and a haze level of approximately 36%.

Example 11

Example 1 was repeated with a combination of a green anthraquinone dye and a yellow pyrazolone dye incorporated into the lower index polymer PMMA at a concentration of 0.15%. This resulted in a film similar to the colored iridescent film with a green dye, but with a non-glossy, satiny surface and a haze level of approximately 36%.

Example 12

Example 1 was repeated with a yellow pyrazolone dye incorporated into the lower index polymer PMMA at a concentration of 0.15%. This resulted in a film similar to the colored iridescent film with a yellow dye, but with a non-glossy, satiny surface and a haze level of approximately 36%.

Various changes and modifications can be made in the present invention without departing from the spirit and scope thereof. The above examples show films made with combinations of PBT, PET, PETG and PMMA. The pearlescent pigments can be incorporated into any thermoplastic resinous material that can be used as the outer skin materials to make an iridescent film. The pearlescent pigments can also be incorporated into more than one component of the iridescent film as long as the iridescent color obtained from the optical core is not destroyed or obscured.

It will be appreciated that while the invention has been described with reference to the cast, flat film type of film production, iridescent films can also be made by the tubular (blown film) process. Accordingly, the various embodiments disclosed herein were for the purpose of illustration only and were not intended to limit the invention.

The present invention is to be limited not by the specific disclosure herein, but only by the appended claims.

What is claimed is:

1. A thermoplastic multilayer coextruded resinous film comprising a plurality of coextruded very thin layers of transparent thermoplastic resinous materials, said layers being substantially parallel, the contiguous layers being of different transparent thermoplastic resinous materials differing in refractive index, each outermost layer constituting a skin, said skin constituting at least 5% of the total thickness of the film, said multilayer film containing a sufficient quantity of a pearlescent pigment to render it non-glossy wherein said pearlescent pigment is incorporated in at least one of the interior layers.

2. The thermoplastic multilayer resinous film of claim 1 having at least 10 said very thin layers.

3. The thermoplastic multilayer resinous film of claim 1 having at least 35 said very thin layers.

4. The thermoplastic multilayer resinous film of claim 1 having at least 70 said very thin layers.

5. The thermoplastic multilayer resinous film of claim 1 wherein contiguous adjacent layers differ in refractive index by at least about 0.03.

6. The thermoplastic multilayer resinous film of claim 1 wherein contiguous adjacent layers differ in refractive index by at least about 0.06.

7. The thermoplastic multilayer resinous film of claim 1, wherein said thermoplastic resinous materials are selected from the group consisting of polyethylene terephthalate, polybutylene terephthalate, glycol modified polyethylene terephthalate and polymethyl methacrylate.

8. The thermoplastic multilayer resinous laminate film of claim 1 wherein one of the thermoplastic resinous materials is polyethylene terephthalate.

9. The thermoplastic multilayer resinous film of claim 1 wherein one of the thermoplastic resinous materials is polymethyl methacrylate.

10. The thermoplastic multilayer film of claim 1 also containing a sufficient quantity of a transparent dye dissolved in at least one of said layers to enhance or modify the apparent color of at least one of the reflection and transmission colors of the film.

11. The thermoplastic multilayer resinous film of claim 10 in which the dye is present in each of the different thermoplastic resinous materials.

12. The thermoplastic resinous multilayer film of claim 10 in which said dye is present in less than all of the different transparent thermoplastic resinous materials.

13. The thermoplastic multilayer resinous film of claim 1 wherein said pearlescent pigment is further incorporated in at least one of said skin layers.

* * * * *